(12) United States Patent
Herrmann et al.

(10) Patent No.: US 8,746,904 B2
(45) Date of Patent: Jun. 10, 2014

(54) SEAL AND EXTERIOR REAR VIEW MIRROR ASSEMBLY

(75) Inventors: Andreas Herrmann, Winnenden-Baach (DE); Reinhard Koenig, Stuttgart (DE)

(73) Assignee: SMR Patents S.a.r.l., Luxembourg (LU)

( * ) Notice: Subject to any disclaimer, the term of this patent is extended or adjusted under 35 U.S.C. 154(b) by 231 days.

(21) Appl. No.: 13/181,667

(22) Filed: Jul. 13, 2011

(65) Prior Publication Data

US 2012/0014007 A1 Jan. 19, 2012

(30) Foreign Application Priority Data

Jul. 15, 2010 (EP) ..................................... 10169610

(51) Int. Cl.
*G02B 7/182* (2006.01)
*G02B 5/08* (2006.01)

(52) U.S. Cl.
USPC ........................................... 359/871; 359/844

(58) Field of Classification Search
None
See application file for complete search history.

(56) References Cited

U.S. PATENT DOCUMENTS 6,315,421 B1 * 11/2001 Apfelbeck et al. ............ 359/871

FOREIGN PATENT DOCUMENTS

| DE | 10115693 | 10/2002 |
|---|---|---|
| JP | 06191348 | 12/1994 |
| JP | 11139208 | 5/1999 |
| JP | 2000085467 | 3/2000 |
| JP | 2001322498 | 11/2001 |
| JP | 2008271699 | 6/2008 |

OTHER PUBLICATIONS

European Search Report for application No. 10169610.2-1523 dated Oct. 28, 2010.

* cited by examiner

*Primary Examiner* — Jade R Chwasz
(74) *Attorney, Agent, or Firm* — Reising Ethington PC

(57) ABSTRACT

A seal of an exterior rear view mirror assembly relative to a body part of a motor vehicle is described, which is formed as one piece, and comprises a sealing pad and a sealing grommet integrally molded on the sealing pad. The sealing pad covers at least one section of the surface of a minor base of the exterior rear view minor assembly lying on the bodywork side. The sealing grommet serves for sealing at least one feed-through opening, which is provided on the bodywork side for feed-through of the cable harness of the exterior rear view minor assembly. The sealing grommet is formed as an open hollow body on the free end, which is turned away from the sealing pad. A passage opening is provided for the cable harness at the intersection of the symmetry axis of the hollow body with the sealing pad.

13 Claims, 9 Drawing Sheets

SEAL AND EXTERIOR REAR VIEW MIRROR ASSEMBLY

The invention is based on a priority patent application EP 10169610.2 which is hereby incorporated by reference.

BACKGROUND ART

1. Field of the Invention

The invention relates to a seal of an exterior rear view mirror assembly, relative to bodywork or a body part of a motor vehicle, as well as an exterior rear view mirror assembly for a motor vehicle wherein the seal being formed as one piece, and comprising a sealing pad and a sealing grommet integrally moulded onto the sealing pad, whereby the sealing pad covers at least a section of the surface of the mirror base of the exterior rear view minor assembly lying on the bodywork side, and the sealing grommet serves to seal at least one feed-through opening provided on the bodywork side for feed-through of a cable harness of the exterior rear view mirror assembly, whereby the sealing grommet is arranged as an open body on the free end turned away from the sealing pad, and a passage opening for the cable harness is provided on the intersection of the symmetry axis of the hollow body with the sealing pad, and that corresponding fixing elements for fixing the seal on the minor base are provided on the sealing pad as well as on the surface of the minor base lying on the bodywork side.

2. Description of the Related Art

An exterior rear view mirror assembly for a motor vehicle consists, for example, of a minor base arranged on the motor vehicle, which can be covered by means of a mirror base cover, and an exterior rear view mirror arranged on the minor base. The exterior rear view minor includes an exterior rear view minor housing, which, inter alia, houses the base bracket assigned to the minor base.

The minor base and base bracket are hinged together, so that the exterior rear view mirror can be pivoted about a hinge axis in relation to the mirror base from an operating position to a folding point and vice versa. The minor base and base bracket can be produced from die-casting material, for example, from the same material.

An adjusting device for a minor glass, driven by an electric motor, for example, is arranged on the base bracket. The adjusting device acts on a backing plate, on which the minor glass is arranged. The minor glass can be mounted onto the backing plate by means of an adhesive connection. The backing plate can be guided to and/or mounted on the adjustment device and/or the base plate. The term 'backing plate' here refers to any type of bracket, which comprises at least one bracket surface, with a plane or vaulted design, closed or in a non-continuous grid, for example, honeycombed, on which it is suitable to attach a minor glass, for example by means of an adhesive connection or by clipping e.g. locking means, protruding behind the perimeter of the bracket surface and arcing inwards towards the centre of the bracket surface, seen from the perimeter.

On its rear side, facing away from the direction of movement of the vehicle in the operating position, the exterior rear view mirror housing comprises an opening, through which the minor glass is visible, or in which the minor glass is arranged. In order to ensure that the mirror glass is adjustable, a distance is kept on all sides between the mirror glass or backing plate and the walls of the exterior rear view mirror housing surrounding the opening, so that a gap is given around the minor glass between the walls of the exterior rear view minor housing surrounding the opening.

In addition to or in place of a minor glass, which is adjustable by an electric motor, the exterior rear view mirror can house one or several additional electrical components. Examples of electrical components of this type are:
- a turn signal indicator
- an entry light
- a heatable minor glass,
- an electro-chromatically dimmable mirror glass,
- a detection module and/or warning display module for a driving assistance device, such as blind spot monitoring, a lane departure warning, approach monitoring, or similar,
- a sensor for detecting driving and/or surrounding conditions, such as for example, temperature, brightness, degree of pollution, lighting situation, for example, in order to automatically heat the minor glass, or to dim electro-chromatically, for example.

In addition, the exterior rear view mirror can comprise one or several combinations of the electrical components given as examples.

The electrical components in the exterior rear view minor are connected to a power supply on the vehicle side, and/or to a control device on the vehicle side, for example, by means of an electrical connection through the minor base, for example, by a vehicle electrical system and/or a bus system. The electrical connection consists, for example, of a cable harness with several cables, if necessary, each with separate plug connections to the electrical terminal of the electrical components, in each case individually or in groups, and at least one electrical plug connection for continuative electrical contacting on the vehicle side.

In order to satisfy high demands of quality in the automotive industry, it is known to close or shut off and/or seal cavities in the bodywork or in body parts or in portions of the bodywork or of body parts, for example, in order to avoid the entry of dirt and/or moisture. It is also known, for example, to close openings, which are provided for feed-through of a cable harness in the bodywork or in body parts, so that no undesired dirt and/or moisture can enter through these openings. An example of a closed cavity in a body part is a drying room in a motor vehicle door. The drying room takes up a portion of the vehicle door, for example, between the outside door panel, which forms an exterior wall, and a dividing wall in the door interior. However, the drying room can also be attached on a dividing wall in the door interior, towards the door inner side. This can serve, for example, to house electrical plug connections, so that they are protected from corrosion. For example, an electrical plug connection of this type of an electrical connection can serve for power supply and/or control of an electrical component, arranged in the cavity, where applicable, such as perhaps electrically operated windows. An example of an opening, provided for feed-through of a cable harness, which is to be closed, is an opening leading through one or several successive walls of bodywork or of a body part, for example, into a cavity or drying room, or from a body part into another body part.

Accordingly, one or several openings, which are closed to prevent the entry of dirt and/or moisture, can serve for feed-through of one or several cable harnesses in the cavity or drying room. Openings, which are to be closed, can also be provided, through which a cable harness, which stems from one side, passes through a cavity lying between two or several walls of a body part, and reappears on the other side, for example, in order to enter a drying room attached to the cavity and separated from this by a wall.

When mounting an exterior rear view mirror assembly onto bodywork or a body part of a motor vehicle, it can therefore be intended to seal the minor base as well as the mirror base covering against the vehicle. For this, it is known to provide at least one section of the surface of the minor base lying on the bodywork side with at least one matt-type underlay, which is also denoted as a sealing pad. The sealing pad can consist of a foamed material. The section of the surface of the minor base lying on the bodywork side is, for example, a surface portion surrounding the exit, on the vehicle side, of the cable harness from the mirror base.

In addition, it can also be intended to seal the feed-through, on the vehicle side, of the cable harness stemming from the mirror base, for example, through a vehicle door, or through a portion of a vehicle door, if appropriate. A sealing grommet can be provided for this. In this process, the sealing grommet is designed so that, along the cable harness, for example, no dirt and no moisture can enter into the interior of the vehicle door, or for example, at least into the interior of a sealed cavity taking up a portion of the vehicle door, through which a cable harness, stemming from one side, passes through the cavity and reappears on the other side. The sealing grommet can simultaneously serve to seal the feed-through of the cable harness by a previously mentioned sealing pad.

The disadvantage of the known solutions for sealing the minor base, as well as the mirror base covering, if necessary, against the vehicle by means of a sealing pad, and the feed-through, on the vehicle side, of the cable harness stemming from the minor base, by means of a sealing grommet, is that both the sealing pad and sealing grommet can slip during installation, in each case in relation to their intended location relative to the mirror base, as well as in relation to each other. The result of this can be an imperfect sealing, whereby dirt and/or moisture can consequently pass through an opening provided for feed-through of a cable harness, and can enter a cavity closed off from the environment by means of the sealing pad and/or sealing grommet.

It is also known from DE10115693A1 to close a feed-through for a cable harness by means of a gel-like mass, which fills the moulded part surrounding the cable harness and a space remaining between the moulded part and the cable harness.

The disadvantage of this is the complicated installation and maintenance when using the gel-like mass. In addition, the orientation with an exact location and position of the moulded part and a required sealing pad, if applicable, remains unresolved.

JP2008271699 shows a seal surrounding a cable harness. The seal has a tubular central part, which runs on the side of the mirror base in a flat surface, following the vehicle contour, and which runs on the second side in the inside of the door in a region tapering to the cable harness. This seal must be attached around the cable harness before the cable harness is installed with the seal in the vehicle door. Pulling out the cable harness after installation of the seal is not possible. The flat part of the seal 32 has no structure at all to prevent slipping.

JP 11139208 describes a flat seal 3, which is attached to the mirror base of an exterior mirror. The seal comprises a flat region, but no sealing grommet, since this mirror is not attached to a sealed door, but rather on a minor triangle of a vehicle.

SUMMARY OF THE INVENTION

An object of the invention is to create an improved seal of an exterior rear view minor assembly relative to a vehicle.

The object is achieved by the Seal of an exterior rear view mirror assembly relative to a body part of a motor vehicle, characterized in that, the seal is formed as one piece, and comprises a sealing pad and a sealing grommet integrally moulded onto the sealing pad, whereby the sealing pad covers at least a section of the surface of the mirror base of the exterior rear view mirror assembly lying on the bodywork side, and the sealing grommet serves to seal at least one feed-through opening provided on the bodywork side for feed-through of a cable harness of the exterior rear view mirror assembly, whereby the sealing grommet is arranged as an open body on the free end turned away from the sealing pad, and a passage opening for the cable harness is provided on the intersection of the symmetry axis of the hollow body with the sealing pad, and that corresponding fixing elements for fixing the seal on the mirror base are provided on the sealing pad as well as on the surface of the mirror base lying on the bodywork side; and by an exterior rear view mirror assembly for a motor vehicle, characterized by a seal.

According to a first item of the invention, a seal of an exterior rear view mirror assembly relative to a body part of a motor vehicle is provided. The seal is designed as one piece. The seal consists at least of at least one sealing pad and at least one sealing grommet, which is integrally moulded on the sealing pad, and stands on the sealing pad. The sealing pad covers at least one section of the surface of a minor base of the exterior rear view minor assembly lying on the bodywork side. The sealing grommet serves for sealing at least one feed-through opening on the bodywork side, which is provided for feed-through of a cable harness of the exterior rear view minor assembly. The sealing grommet is designed as a hollow body. A passage opening is provided for the cable harness at the intersection of the symmetry axis of the hollow body with the sealing pad. The symmetry axis is here defined as a constant curve, running straight, at least partly, or in a curved manner, for example, on which points lie successively along the inside of the hollow body standing on the sealing pad. The symmetry axis can be formed by the central points of successive cross-sections of the hollow body, for example. Particularly preferably, the symmetry axis can be the geometric symmetry axis or symmetry curve of the hollow body, or can include a geometric symmetry axis of symmetry curve, at least in sections. The free end of the sealing grommet, which is turned away from the sealing pad, is open. The hollow body can be a hollow rotary body, for example. The symmetry axis preferably corresponds here to the rotation axis of the hollow rotary body. The passage opening for the cable harness is provided at the intersection of the rotation axis of the hollow rotary body of the sealing grommet with the sealing pad. In addition to a hollow rotary body, any other forms are possible, for example, a cylinder, cone or cone portion, both with circular, as well as polygonal base surfaces, as well as with continually changing geometries in successive cross-sections along the symmetry axis, for example. Here, the symmetry axis can run at any angle to the surface formed by the sealing pad. In theory it is also possible for the symmetry axis to run at least along a portion along a curve, instead of along a line, which is preferably provided.

The term 'body part' here refers to both the bodywork of a motor vehicle as a whole, as well as all parts forming the bodywork of a vehicle, such as perhaps doors, bonnets, covers, chassis etc. themselves, as well as portions or sections of the bodywork or its parts. In this context, the term 'feed-through opening' denotes a opening provided in a body part of this type for feed-through, on the bodywork side, of the cable harness of the exterior rear view mirror assembly, for example, into a closed cavity or leading out of the former.

The sealing grommet is preferably designed in such a way that it stands long enough on the sealing pad, in order to encase a cable harness, passing through a closed cavity, which stems from a first side, and which passes through a first feed-through opening into the cavity, and emerges from the cavity through a second feed-through opening on another, second side, with simultaneous sealing of at least two successive feed-through openings, as described, at least along the whole passage through the cavity. Due to this casing of the cable harness, at least along the whole passage of the cable harness though the cavity, and due to the simultaneous sealing of the feed-through openings leading into and out of the cavities, the risk of dirt and/or moisture entering the cavity sealed against the environment is completely prevented. In addition, the entry of dirt and/or moisture in a drying room attached to the cavity, in which drying room the cable harness can enter, after leaving the cavity through the second feed-through opening, is particularly effectively prevented, since dirt and/or moisture must pass through the whole sealing grommet extending through the cavity, in order to reach the drying room.

The sealing grommet can comprise at least a final internal diameter, which is preferably smaller than a smallest external diameter of the cable harness. The sealing grommet can also comprise at least a largest external diameter, which is preferably larger than an internal diameter of the feed-through opening provided for feed-through of the cable harness on the bodywork side. Through this, an optimal sealing is achieved both between the sealing grommet and cable harness, as well as between the sealing grommet and the feed-through opening. In addition, due to the integral design of the seal with the sealing pad and sealing grommet, it is ensured that the sealing pad and sealing grommet in each case cannot slip during the assembly, with regard to their intended position in relation to each other.

Seen from the sealing pad, the sealing grommet can have an extending, funnel-shaped design, for example, according to a linear, parabolic or hyperbolic function. Alternatively or additionally, a convergent-divergent cross-sectional course of the sealing grommet or the cavity forming the sealing grommet is possible.

The seal preferably consists of a material or material mix, which is elastically malleable in at least one direction. The term 'material mix' here includes both homogenous, and inhomogeneous material mixtures and material combinations, as well as, fibre-reinforced materials, for example, at least in sections, e.g. in the region of the sealing grommet.

The material or material mix can be foamed, at least in the region of the sealing pad.

On its free end, turned away from the sealing pad, the sealing grommet can be provided with at least one mounting tab, which can be gripped from a side turned away from the mirror base through at least one feed-through opening on the bodywork side, to be sealed by means of the sealing grommet, in order to pull the sealing grommet through the feed-through opening, if necessary under elastic deformation, in the correct position and location.

Alternatively or additionally, separate assembly tools can be provided for this process.

Corresponding fixing elements for fixing the seal onto the mirror base are preferably provided on the sealing pad of the seal, on a side of the sealing pad turned away from the sealing grommet, for example, as well as, if necessary, on the section of the surface covered by the sealing pad, lying on the bodywork side of the mirror base of the exterior rear view mirror assembly.

A first example of corresponding fixing elements are one or several grooves, running in the section, covered by the sealing pad, of the surface of the minor base lying on the bodywork side, which in ease case comprise a rearward engagement acting in a direction, for example, locally normal to the surface, as well as at least one spring, which can be inserted in a form-fit manner in the at least one groove. In this process, the groove with rearward engagement and the spring comprise corresponding geometries, so that, for example, a spring, normal to the surface, which is pushed into the groove from an end of this, cannot be pulled out of the groove. The at least one groove can be arranged optionally on the sealing pad or on the minor base. The same is true with the at least one spring. The advantages of corresponding fixing elements, which include a groove and spring, are that they simultaneously form an anti-twist device, whereby the seal, consisting of the sealing pad and sealing grommet, can be fixed not only in the correct position, but can also be fixed in the correct location on the mirror base. Both the groove, as well as the spring, can be optionally provided on the sealing pad or on the minor base. If more than one groove and spring connection is provided, a mixed arrangement is also possible, in which both a groove as well as a spring can be arranged on the sealing pad and on the minor base, which are then assigned to the respective corresponding fixing element arranged on the opposite-facing component. A clear position and location can be defined by a combination of this type, whereby errors in installation of the seal on the minor base can be avoided.

In this process, the groove and spring can slot together in a dove-tail manner.

A second example for corresponding fixing elements are at least one extension, preferably arranged on the sealing pad on its side which is turned away from the sealing grommet, as well as a receiving opening, which is arranged in the section of the surface of the minor base lying on the bodywork side, which is covered by the sealing pad, and which is assigned to the extension. Seen from the sealing pad, the extension preferably consists of a first portion with constant cross-sectional dimensions, for example. The cross-sectional dimensions preferably approximately correspond to the cross-sectional dimensions of the receiving opening. A thickening with increasing cross-sectional dimensions is attached on the first portion, which fits through the receiving opening under elastic deformation, and the elastic deformation subsequently assumes a frictionally engaged or form-fit connection at least with one section, surrounding the receiving opening, of the surface of the minor base lying on the bodywork side. The section of the surface of the minor base lying on the bodywork side is, for example, a surface section situated around the exit of the cable harness from the minor base on the vehicle side. If more than one extension and, accordingly, many receiving openings are provided, these also form an anti-twist device when they are slotted together. Alternatively or additionally, it is possible that the extension and the receiving opening comprise a cross-sectional geometry, which makes it impossible for the extension to twist in the receiving opening.

On its free end, which is turned away from the sealing pad and towards the mirror base, the extension can be provided with at least one assembly fitting. The assembly fitting can be seized from the side turned away from the sealing pad through the receiving opening on the mirror base, in order to pull the extension through for fixing the seal on the minor base, under elastic deformation of the thickening through the receiving opening.

Alternatively or additionally, separate assembly tools can be provided for this process.

In addition, one or several lips protruding in the direction of the mirror base e.g. on the periphery of the sealing pad, which are adapted in their geometry to the recesses and/or to the edges of the surface of the minor base turned towards the sealing pad, for example. These can also contribute to the anti-twist device, and therefore help to ensure that the orientation of the seal and minor base is in correct location and position relative to each other during installation.

It is important to emphasise that mounting tabs, grooves and/or springs, extensions, assembly fittings, lips, if provided alone or in any combination respectively, are preferably integrally moulded on the seal with a sealing pad and sealing grommet.

A second item of the invention relates to an exterior rear view minor assembly for a motor vehicle with a seal, as previously described.

BRIEF DESCRIPTION OF THE DRAWINGS

Further features of the invention result from the claims, description and drawings.

Execution examples of the invention are subsequently explained in more detail by means of the drawings. Identical reference characters denote identical or identically acting elements. In the drawings, shown schematically.

DETAILED DESCRIPTION OF THE DRAWINGS

Figure 1:
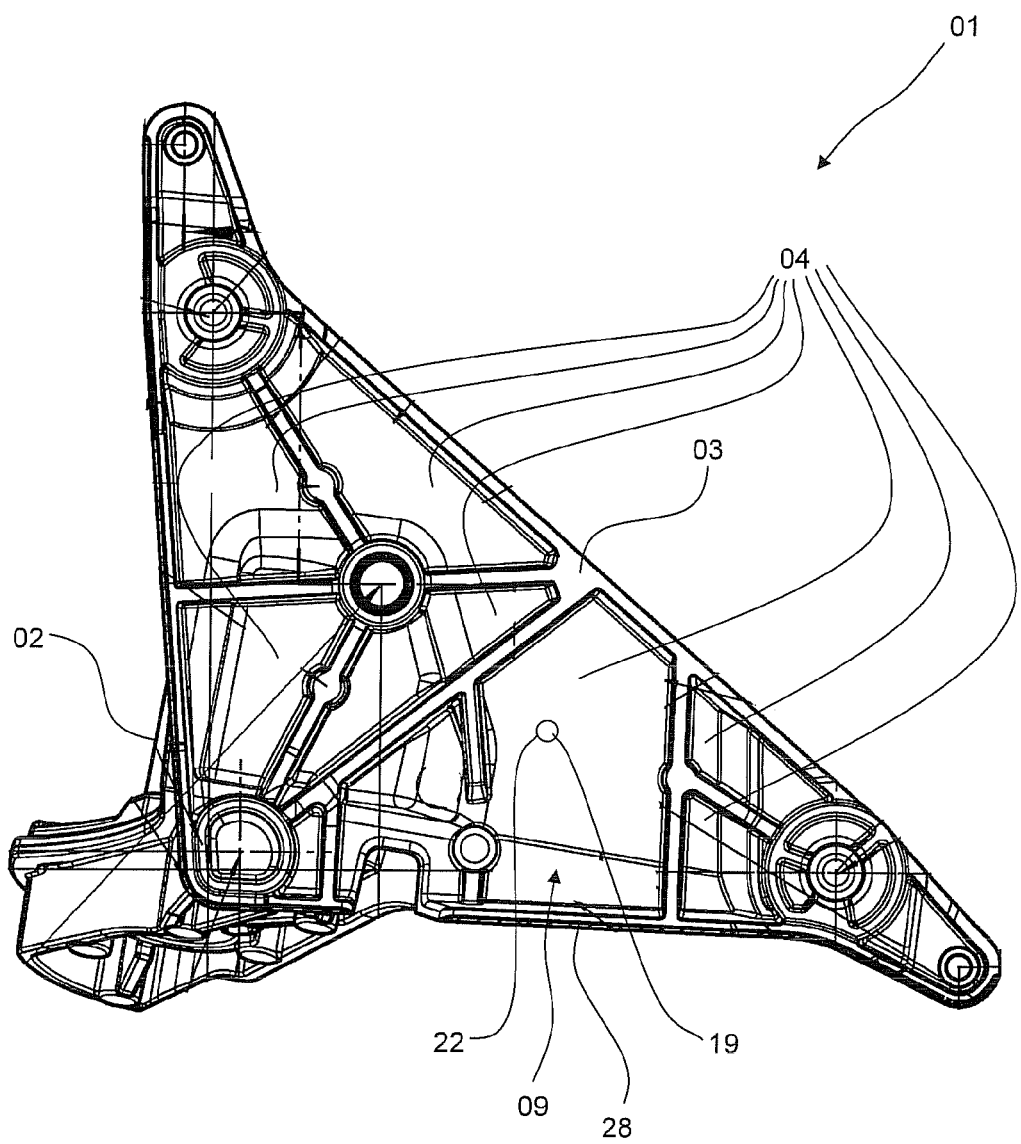
FIG. 1 shows a top view of a surface of a minor base of an exterior rear view minor assembly, lying on the bodywork side.

A mirror base 01, shown in FIG. 1, of an exterior rear view minor assembly for a motor vehicle, essentially includes a part 02 on the minor base side of an articulated connection between the minor base 01, and a base bracket, which is preferably housed in an exterior rear view mirror housing of an exterior rear view mirror of the exterior rear view minor assembly, for example, as well as a surface 03 lying on the bodywork side, in the case of intended mounting onto a body part 05 (FIG. 2, FIG. 3, FIG. 4) of the motor vehicle.

Recesses 04 can be provided in the surface 03, for example, for saving of material and therefore saving of weight.

Figure 2:
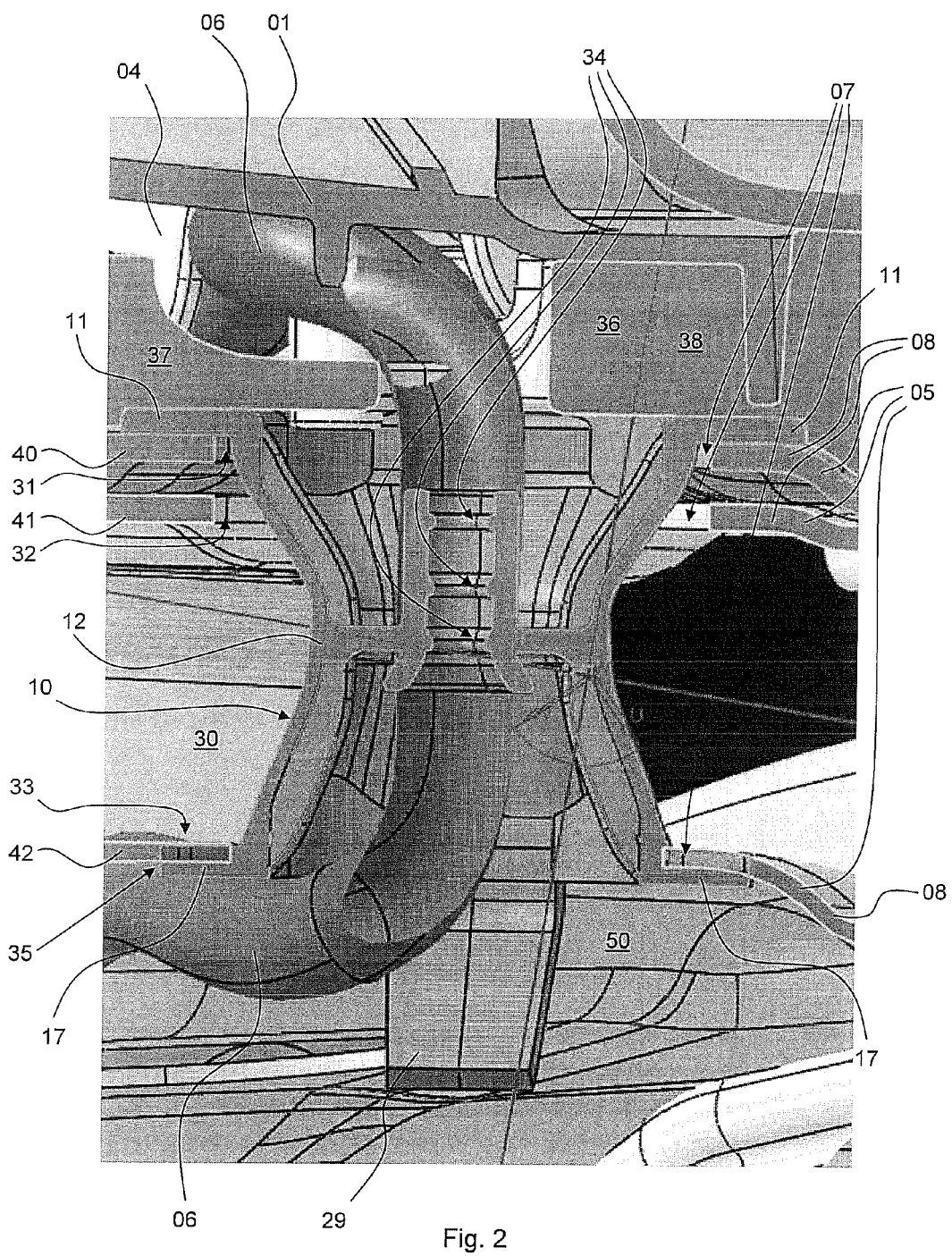
FIG. 2 shows a first cut through a feed-through of a cable harness stemming from a minor base of an exterior rear view minor assembly, through a portion of a body part.
Figure 3:
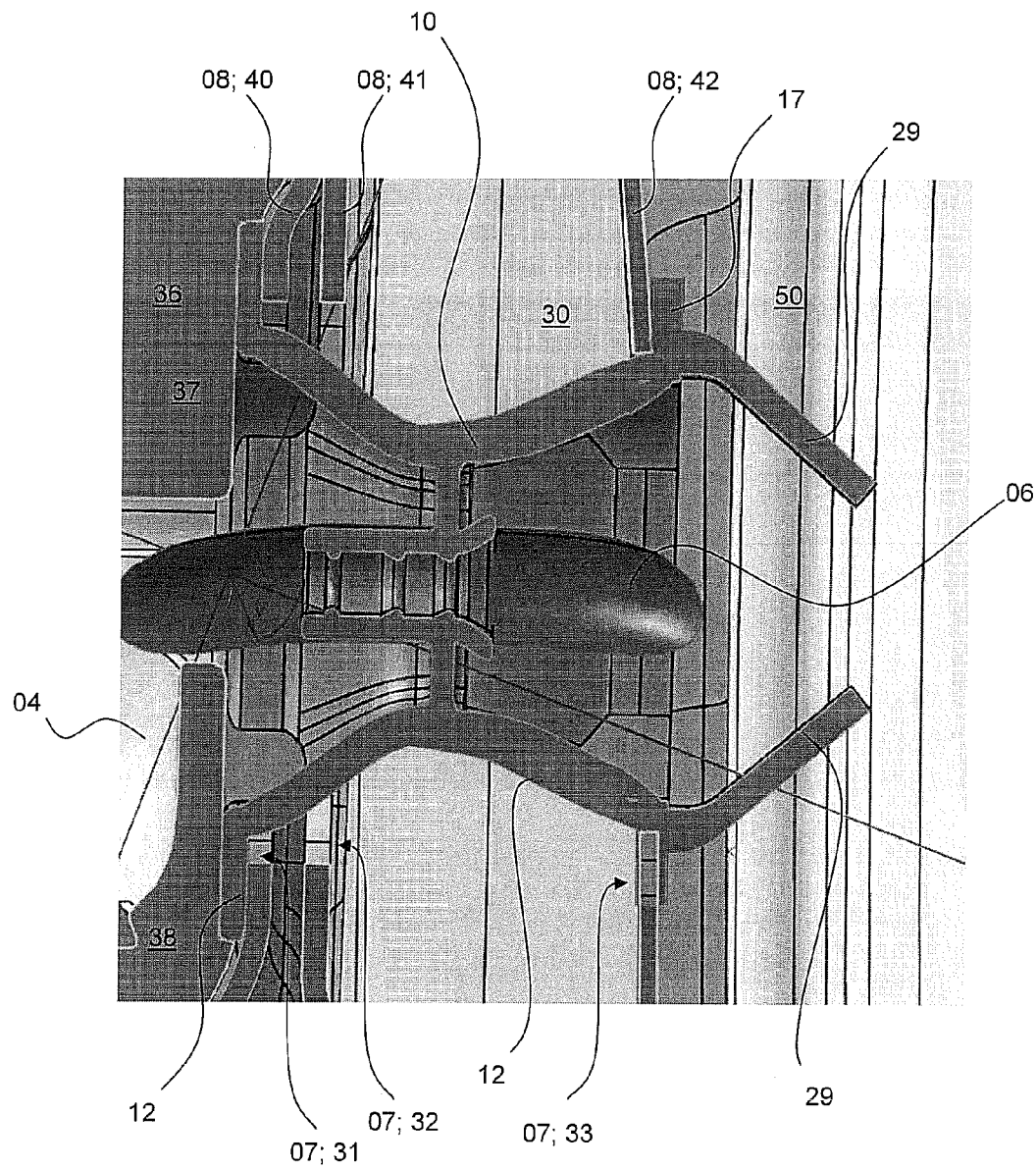
FIG. 3 a second cut through a feed-through of a cable harness stemming from a mirror base of an exterior rear view minor assembly, through a portion of a body part.
Figure 4:
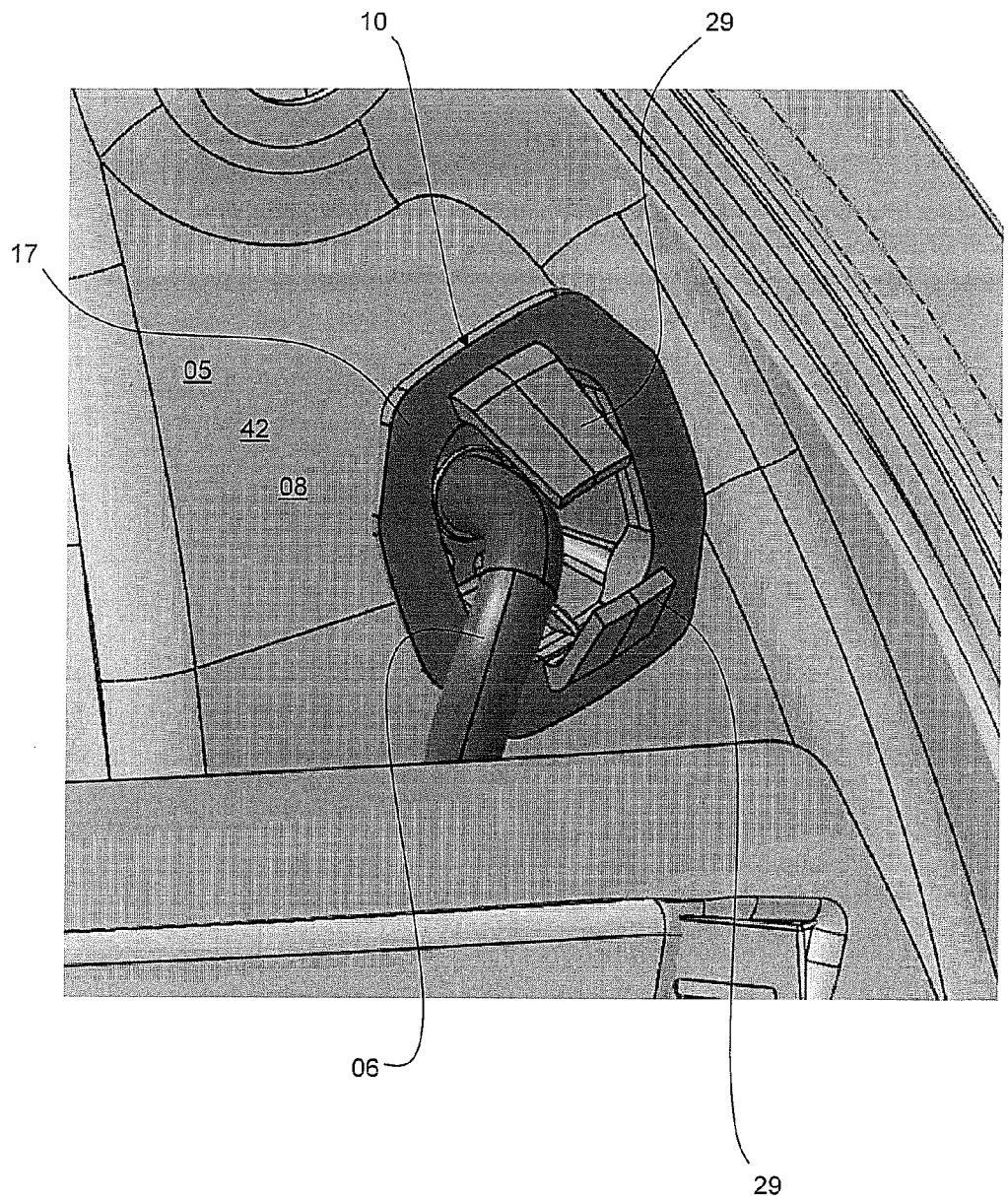
FIG. 4 shows an exit of a feed-through of a cable harness stemming from a mirror base of an exterior rear view minor assembly, on a side of the body part turned away from the mirror base, from a perspective view.
Figure 5:
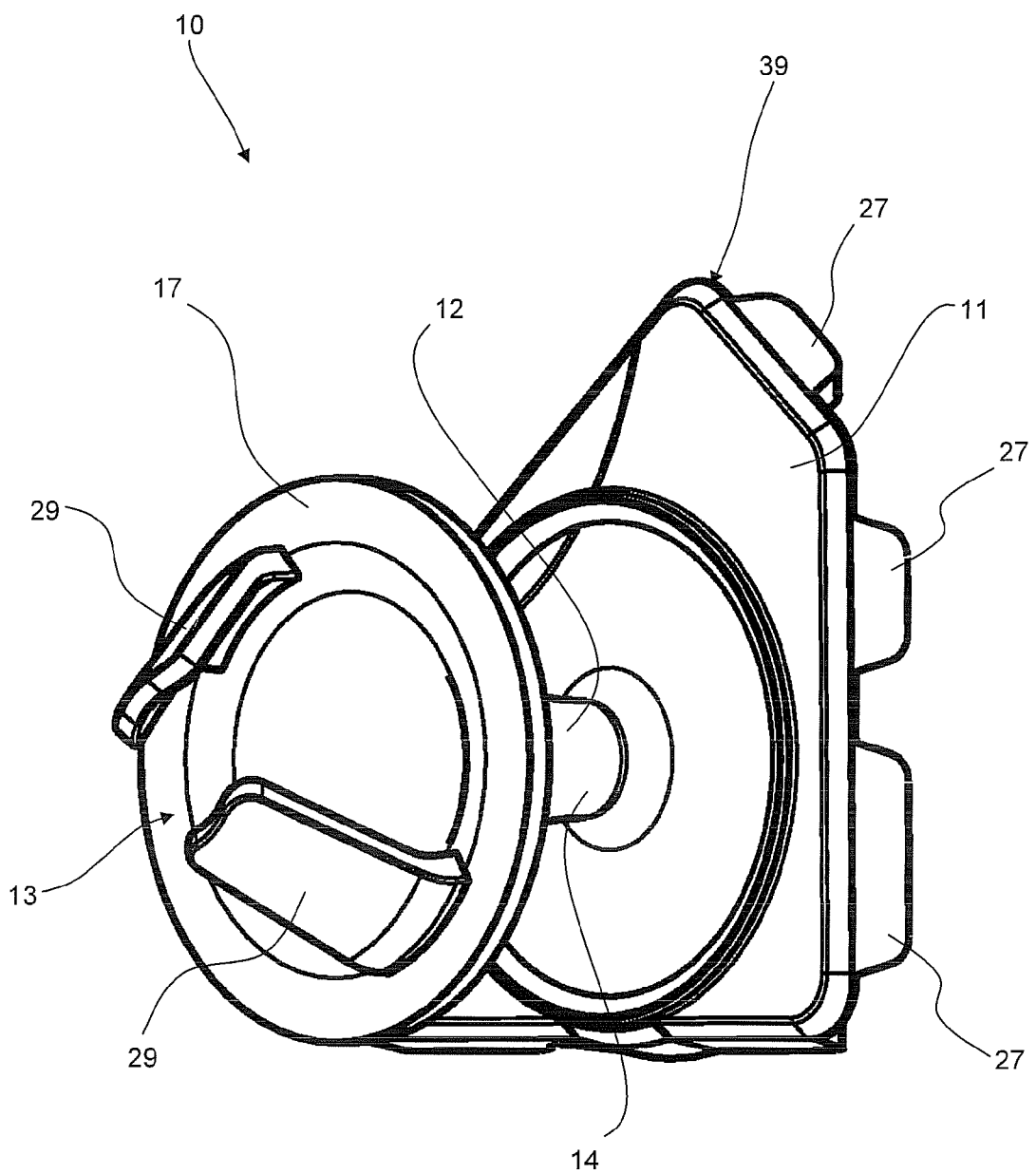
FIG. 5 shows a first execution example of a seal for a feed-through of a cable harness stemming from a mirror base of an exterior rear view minor assembly, provided through a portion of a body part, seen from a perspective view from a side turned away from the mirror base.
Figure 6:
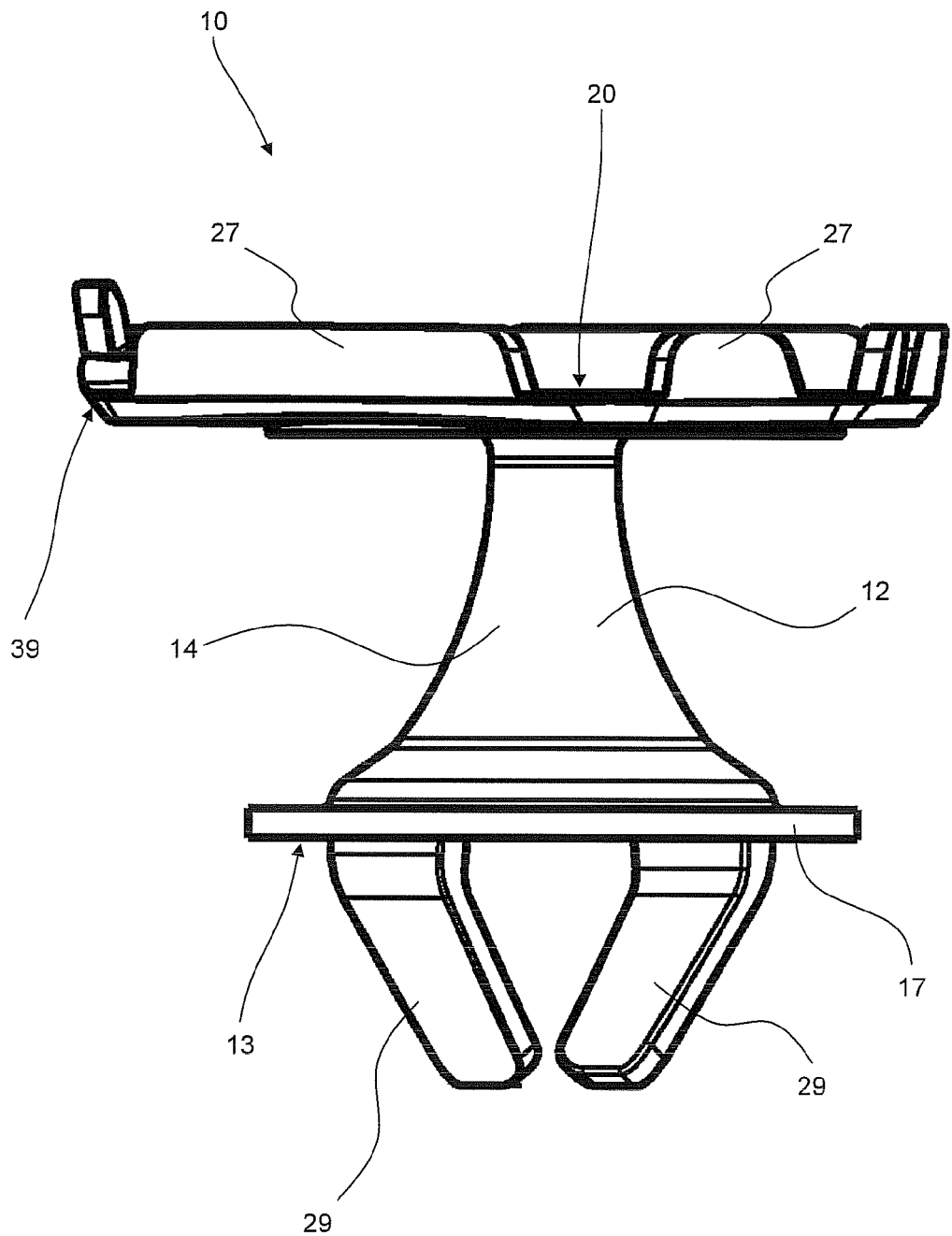
FIG. 6 the seal from FIG. 5 in a side view.
Figure 7:
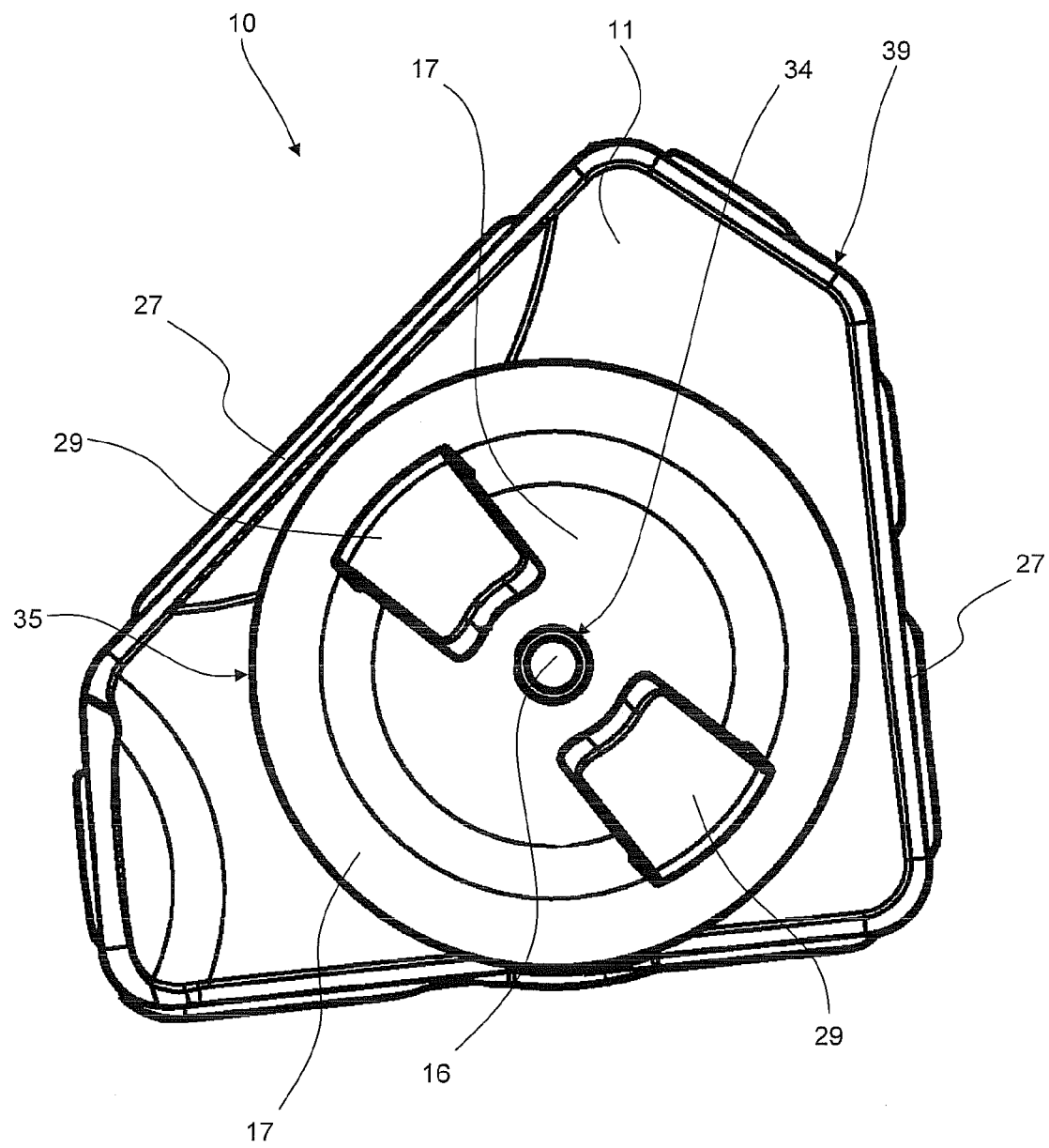
FIG. 7 the seal from FIG. 5, seen from a top view of a side turned away from the minor base.

It is at least intended to seal the minor base 01 against the body part 05 during mounting of the exterior rear view mirror assembly onto the body part 05. This includes the feed-through, on the vehicle side, of a cable harness 06 stemming from a minor base 01 of the exterior rear view minor assembly, to seal through at least one feed-through opening 07 in at least one wall 08 of the body part 05 (FIG. 2, FIG. 3, FIG. 4).

Figure 8:
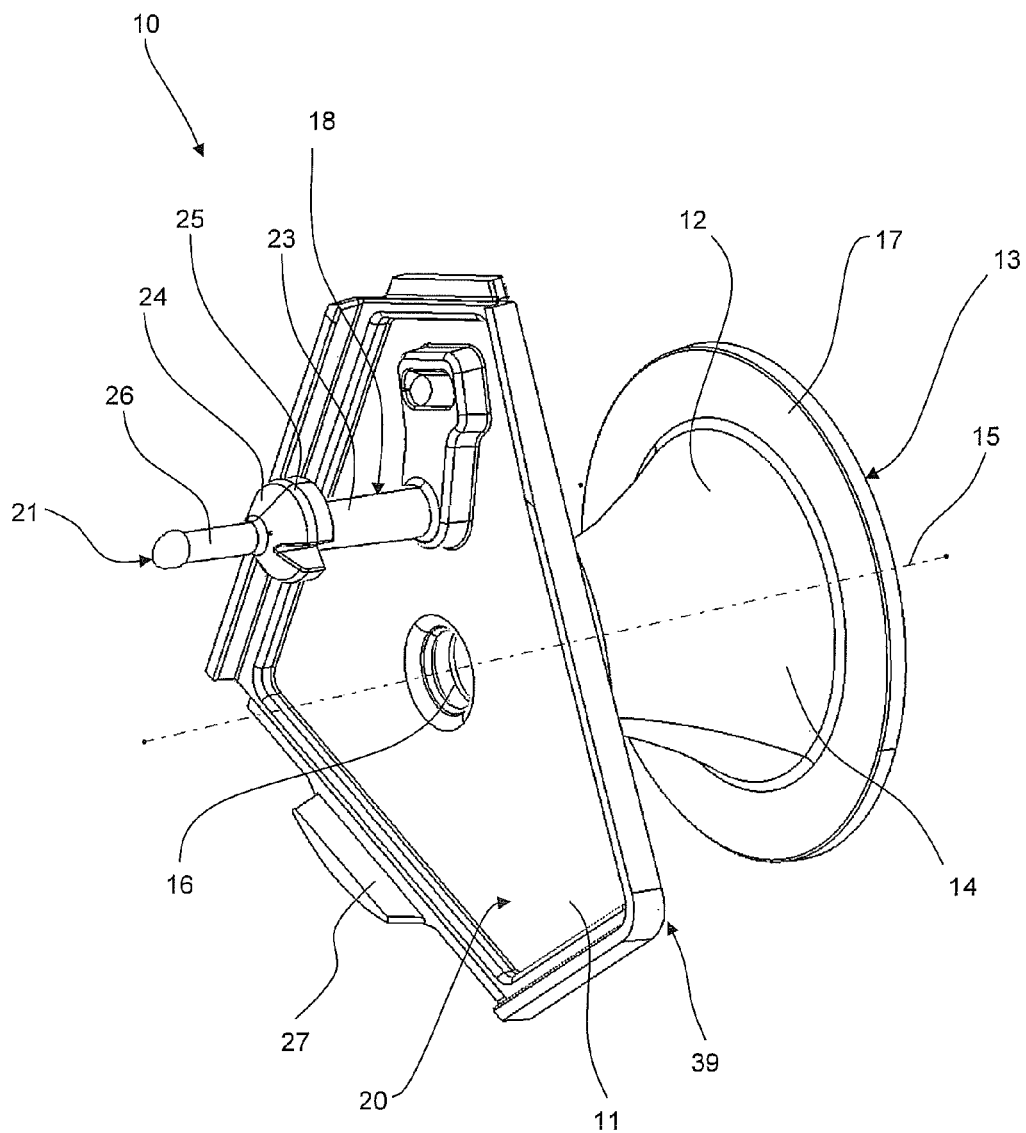
FIG. 8 shows a second execution example of a seal for a feed-through of a cable harness stemming from a minor base of an exterior rear view minor assembly, provided through a portion of a body part, seen from a perspective view from a side turned towards the mirror base.
Figure 9:
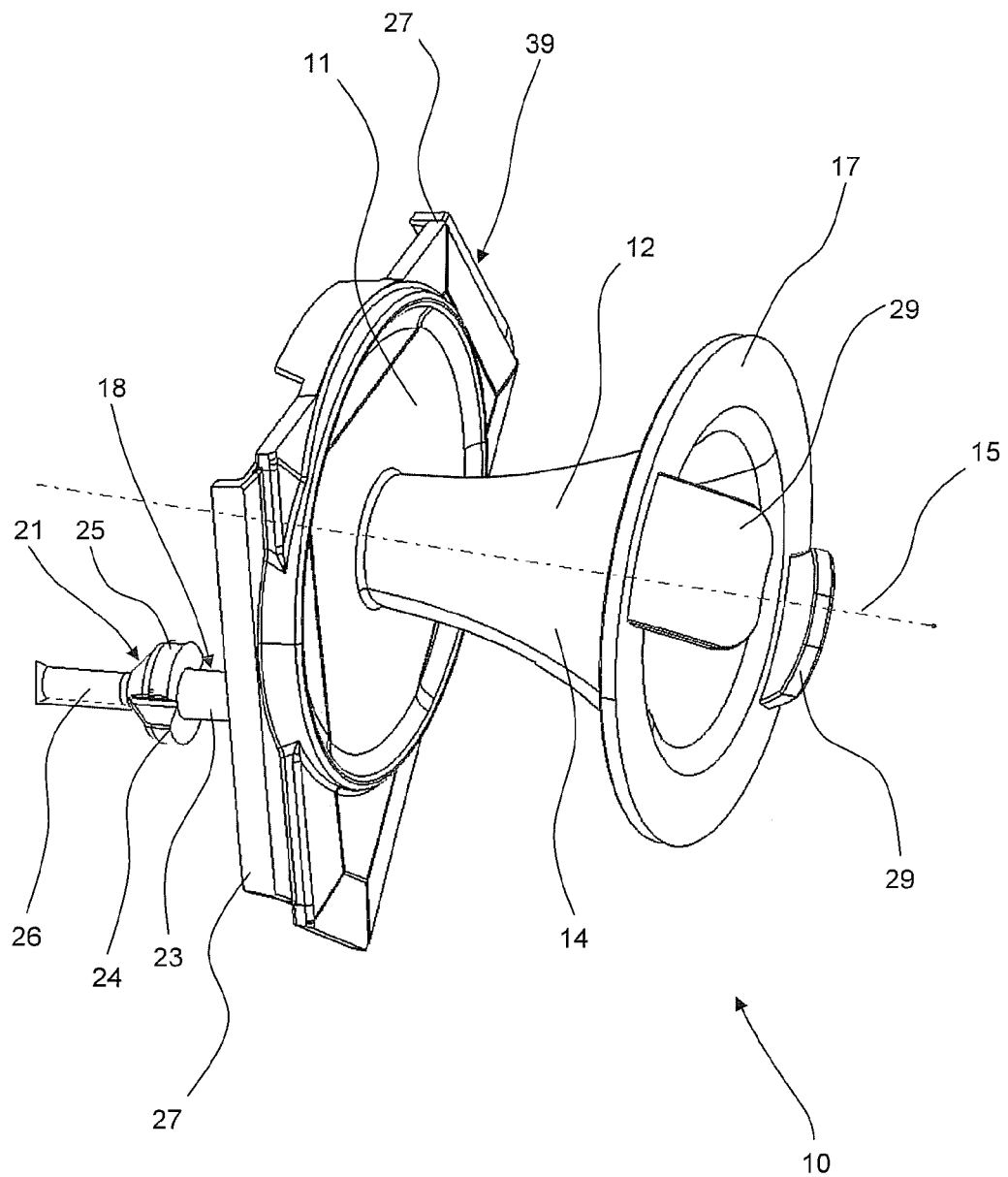
FIG. 9 the seal from FIG. 8, seen in a perspective view of a side turned away from the mirror base.

A seal 10, which is formed as one piece, is provided for this and comprises at least one sealing pad 11 and a sealing grommet 12, which is integrally moulded on the sealing pad 11 (FIG. 5 to FIG. 9). The sealing pad 11 covers at least one section 09 of the surface 04 of the minor base 01 of an exterior rear view minor assembly lying on the vehicle side (FIG. 1). The sealing grommet 12 serves for sealing at least one feed-through opening 07, which is provided on the bodywork side for feed-through of the cable harness 06 (FIG. 2 to FIG. 4). The sealing grommet 12 is designed as an open hollow body 14 on the free end 13, which is turned away from the sealing pad 11. A passage opening 16 for the cable harness 06 is provided in the sealing pad 11 at the intersection of the symmetry axis 15 of the hollow body 14 with a surface including the sealing pad 11 (FIG. 8, FIG. 9).

Seen from the symmetry axis 15, a flange 17, which is cantilevered outwards in a radial manner, can be provided on the free end 13 of the sealing grommet 12.

As shown in FIGS. 5 to 9, the sealing grommet 12 can be arranged extending in a funnel shape, seen from the sealing pad 11. Alternatively, the sealing grommet 12, as shown in FIGS. 2 to 3, can comprise a convergent-divergent cross-sectional course.

Corresponding fixing elements 18, 19 for fixing the seal 10 on the minor base 01 can be provided on the sealing pad 11, as well as on the surface 03 of the minor base 01 lying on the bodywork side, as shown in FIGS. 1, 8 and 9.

The corresponding fixing elements 18, 19 can concern at least one extension 21, which is arranged on the sealing pad 11 on its side 20 which is turned away from the sealing grommet 12, (FIG. 8, FIG. 9), as well as at least one receiving opening 22, arranged in the section 09, which is covered by the sealing pad 11, of the surface 03 of the mirror base 01 lying on the bodywork side, which receiving opening is assigned to the extension 21 (FIG. 1).

Seen from the sealing pad 11, the extension 21 preferably comprises at least a first portion 23 with cross-sectional dimensions which correspond to the cross-sectional dimensions of the receiving opening 22. Seen from the sealing pad 11, a second portion 24 with a thickening 25 is attached to the first portion 23, which second portion fits through the receiving opening 22 under elastic deformation, and subsequently the elastic deformation assumes a frictionally engaged or form-fit connection at least with one section, which surrounds the receiving opening 22, of the surface 03 of the minor base 01 lying on the bodywork side. After insertion in the receiving opening 22, the frictionally engaged or form-fit connection prevents the extension 21 being pulled out of the receiving opening 22, under the forces which generally occur, at least during installation.

On its free end, which is turned away from the sealing pad 11 and towards the mirror base 01, the extension 21 can be provided with at least one assembly fitting 26. The assembly fitting 26 can be seized from the side of the minor base 01, which is turned away from the sealing pad 11, through the receiving opening 22 on the mirror base 01, in order to pull the extension 21 through the receiving opening 22 during installation, under elastic deformation of the thickening 25, for fixing the seal 10 on the mirror base 01. The side of the minor base 01, which is turned away from the sealing pad 11, concerns a side turned away from the viewer of FIG. 1.

At least one lip 27, protruding in the direction of the minor base 01, can be provided on the periphery 39 of the sealing pad 11, for example, as can be seen in FIGS. 5, 6, 8 and 9. The at least one lip 27 is adapted in its geometry to at least one recess 04, and/or at least one edge 28 of the surface 03 of the mirror base 01 lying on the bodywork side, at least in the region of the section 09 covered by the sealing pad 11 (FIG. 1). The at least one lip 27 serves, inter alia, as an anti-twist device of the seal 10 in relation to the minor base 01 during installation.

In addition, the sealing grommet 12 can be provided on its free end 13, which is turned away from the sealing pad 11, with at least one mounting tab 29. During installation, the mounting tab 29 can be seized from a side turned away from the mirror base 01 through at least one feed-through opening 07 on the bodywork side, which is to be sealed by means of the sealing grommet 12 of the seal 10, in order to pull the sealing grommet 12 through the feed-through opening 07.

As shown in FIGS. 2 and 3, the sealing grommet 12 can be formed standing long enough on the sealing pad 11 in such a way as to encase a cable harness 06, passing in a closed cavity 30 in a body part 05, along the whole passage through the cavity 30. The body part 05 can be a vehicle door, for example. In the process, the cable harness 06, encased by the sealing grommet 12, passes through a first feed-through opening 31 provided in an exterior wall 40 of the body part 05, and enters into the cavity 30 through a second feed-through opening 32 in a first dividing wall 41 stemming from a first side, and re-emerges from the cavity 30 through a third feed-through opening 33 in a second dividing wall 42 on another, second side. In the process, the sealing grommet 12 encases the cable harness 06 along the whole passage through the cavity 30. Simultaneously, the sealing pad 11 of the seal 10 seals the section 09 of the surface 03 of the minor base 01, lying on the bodywork side, against the exterior wall 40 of the body part 05. The flange 17 arranged on the free end 13 of the sealing grommet 13 outwardly overlaps the third feed-through opening 33 in the second dividing wall 42 of the body part 05 in a radial manner, seen from the cable harness 06 (FIG. 04), and seen from the exterior wall 40, thus seals the cavity 30 against a drying room 50, for example, lying further inside, behind the second dividing wall 42 in the body part 05 designed as a vehicle door. In the process, seen from the mirror base 01, the flange 17 engages behind the third feed-through opening 33 and rests behind the second dividing wall 42 on the edge of the third feed-through opening 33 (FIG. 4), seen from the cavity 30.

In addition, in order to obtain a particularly good sealing of the drying room 50 in relation to the prevailing environment outside of the exterior wall 40 of the body part 05, the sealing grommet 12 comprises a final internal diameter 34, which is smaller than the smallest external diameter of the cable harness 06. In addition, preferably at least on its free end 13, the sealing grommet 12 can also comprise a largest external diameter 35, which is larger than an internal diameter of the feed-through opening 07, 31, 32, 33, which is provided for feed-through of the cable harness 06 on the vehicle side. The largest external diameter 35 can be formed by the flange 17, for example. The term 'external diameter' is here not to be understood as a limitation to circular cross-sections, but rather as a general term for measures of dimensions within one or several cross-sections.

It is important to emphasise that recesses 04 provided in the surface 03 of the minor base 01 lying on the bodywork side can at least partly be filled with an elastic material 36; for example, one or several sealing mats 37, 38 covering two or more recesses 04, for example, can be positioned in the recesses 04 (FIG. 1).

It is also important to emphasise that the seal 10 is formed as one piece, and the components of the seal 10, for example, sealing pad 11, sealing grommet 12, mounting tabs 29, extensions 21, assembly fittings 26, and lips 27 are integrally moulded on the seal, for example, in a single or multi-component injection moulding process.

The invention is particularly commercially applicable in the production of exterior rear view minor assemblies for motor vehicles.

LIST OF REFERENCE CHARACTERS

01 Mirror base
02 Part of the articulated connection between the minor base and base bracket
03 Surface lying on the bodywork side
04 Recess
05 Body part
06 Cable harness
07 Feed-through opening
08 Wall
09 Section of the surface lying on the bodywork side
10 Seal
11 Sealing pad
12 Sealing grommet
13 Free end of the sealing grommet
14 Hollow body
15 Symmetry axis
16 Passage opening
17 Flange
18 Fixing element
19 Fixing element
20 Side of the sealing pad, which is turned away from the sealing grommet
21 Extension
22 Receiving opening
23 First portion of the extension
24 Second portion of the extension
25 Thickening
26 Assembly fitting
27 Lip
28 Edge
29 Mounting tab
30 Cavity
31 Feed-through opening
32 Feed-through opening
33 Feed-through opening
34 Final internal diameter
35 Largest external diameter
36 Elastic material
37 Sealing mat
38 Sealing mat
39 Periphery of the sealing pad
40 Exterior wall
41 Dividing wall
42 Dividing wall
50 Drying room

We claim:

1. Seal of an exterior rear view mirror assembly relative to a body part of a motor vehicle,
   wherein
   the seal being formed as one piece, and comprising a sealing pad and a sealing grommet integrally molded onto the sealing pad, whereby the sealing pad covers at least a section of a surface of a mirror base of the exterior rear view mirror assembly lying on a bodywork side, and the sealing grommet serves to seal at least one feed-through opening provided on the bodywork side for feed-through of a cable harness of the exterior rear view mirror assembly, whereby the sealing grommet is arranged as an open body on the free end turned away from the sealing pad, and a passage opening for the cable harness is provided on the intersection of the symmetry axis of the hollow body with the sealing pad, and that corresponding fixing elements for fixing the seal on the mirror base are provided on the sealing pad as well as on the surface of the mirror base lying on the bodywork side, the sealing grommet including at least one mounting tab on its free end, which is turned away from the sealing pad, which can be gripped from a side turned away from the mirror base through at least one feed-through opening on the bodywork side, to be sealed by means of the sealing grommet, in order to pull the sealing grommet through the feed-through opening.

2. Seal according to claim 1,
characterized in that,
the sealing grommet stands along enough on the sealing pad, in order to encase a cable harness, passing through a closed cavity, which passes through a first-feed through opening, stemming from a first side, into the cavity, and emerges from the cavity through a second feed-through opening on another, second side, with simultaneous sealing of at least two successive feed-through openings along the cable harness at least along the whole passage through the cavity.

3. Seal according to claim 1,
characterized in that,
the sealing grommet comprises at least a final internal diameter, which is smaller than a smallest external diameter of the cable harness and/or comprises at least a largest external diameter, which is larger than an internal diameter of the feed-through opening, which is provided for feed-through of the cable harness on the bodywork side.

4. Seal according to claim 1,
characterized in that,
the sealing grommet has an extended funnel shape, seen from the sealing pad.

5. Seal according to claim 1,
characterized in that,
the corresponding fixing elements include at least one groove arranged on the mirror base or on the sealing pad, running in the surface of the mirror base lying on the bodywork side, as well as at least one spring arranged on the sealing pad or the mirror base, which spring can be inserted in a form-fit manner into the at least one groove, whereby the groove comprises at least one rearward engagement acting in a direction which is locally normal to the surface, and the groove with rearward engagement and the spring comprise corresponding geometries, so that the spring is prevented from being pulled out of the groove normal to the surface.

6. Seal according to claim 5,
characterized in that,
the groove and spring slot together in a dove-tail manner.

7. Seal according to claim 1,
characterized in that,
the corresponding fixing elements comprise at least one extension arranged on the sealing pad on its side turned away from the sealing grommet, as well as at least one receiving opening arranged in the section, covered by the sealing pad, of the surface of the mirror base lying on the bodywork side, and assigned to the extension, whereby, seen from the sealing pad, the extension comprises at least a first portion with cross-sectional dimensions, which correspond to the receiving opening, as well as a second portion with a thickening, which passes through the receiving opening under elastic deformation, and subsequently the elastic deformation assumes a frictionally engaged or form-fit connection at least with a section, surrounding the receiving opening, of the surface of the mirror base lying on the bodywork side.

8. Seal according to claim 7,
characterized in that,
the extension is provided on its free end, which is turned away from the sealing pad and turned towards the mirror base, with at least one assembly fitting, which can be seized from the side of the mirror base turned away from the sealing pad through the receiving opening on the mirror base, in order to pull the extension through the receiving opening under elastic deformation of the thickening, for fixing the seal on the mirror base.

9. Seal according to claim 1,
characterized in that,
at least one lip protruding in the direction of the mirror base is provided on the sealing pad, which is adapted in its geometry to at least one recess, and/or at least one edge of the surface of the mirror base lying on the bodywork side, turned towards the sealing pad.

10. Seal according to claim 1,
characterized in that,
that mounting tabs, grooves and/or springs, extensions, assembly fittings, lips are integrally molded on the seal.

11. Seal according to claim 1,
characterized in that,
the seal preferably consists of a material, or material mix, which is elastically malleable in at least one direction.

12. Seal according to claim 11,
characterized in that,
the material or material mix is foamed, at least in the region of the sealing pad.

13. Exterior rear view minor assembly for a motor vehicle defining a bodywork side, the exterior rear view mirror comprising:
a mirror base defining a surface;
wherein
a seal being formed as one piece, and comprising a sealing pad and a sealing grommet integrally molded onto the sealing pad, whereby the sealing pad covers at least a section of the surface of the mirror base of the exterior rear view minor assembly lying on the bodywork side, and the sealing grommet serves to seal at least one feed-through opening provided on the bodywork side for feed-through of a cable harness of the exterior rear view minor assembly, whereby the sealing grommet is arranged as an open body on the free end turned away from the sealing pad, and a passage opening for the cable harness is provided on the intersection of the symmetry axis of the hollow body with the sealing pad, and that corresponding fixing elements for fixing the seal on the minor base are provided on the sealing pad as well as on the surface of the minor base lying on the bodywork side, the sealing grommet including at least one mounting tab on its free end, which is turned away from the sealing pad, which can be gripped from a side turned away from the mirror base through at least one feed-through opening on the bodywork side, to be sealed by means of the sealing grommet, in order to pull the sealing grommet through the feed-through opening.

* * * * *